United States Patent [19]

Ganzon et al.

[11] Patent Number: 5,336,048

[45] Date of Patent: Aug. 9, 1994

[54] FLUID DIRECTING DEVICE FOR SEAL CHAMBER

[75] Inventors: Nicolas W. Ganzon; Charles A. Cappellino, both of Seneca Falls; George Wilson, Skaneateles, all of N.Y.

[73] Assignee: Goulds Pumps, Incorporated, Seneca Falls, N.Y.

[21] Appl. No.: 994,892

[22] Filed: Dec. 22, 1992

[51] Int. Cl.⁵ .................................................. F01D 25/18
[52] U.S. Cl. ................................... 415/175; 415/208.1
[58] Field of Search .............. 415/170.1, 171.1, 208.1, 415/175

[56] References Cited

U.S. PATENT DOCUMENTS

| | | | |
|---|---|---|---|
| 4,251,186 | 2/1981 | Chomel et al. | 415/208.1 |
| 4,386,780 | 6/1983 | Dernedde | 415/170.1 |
| 4,491,374 | 1/1985 | Hagshenas et al. | 415/208.1 |
| 5,188,509 | 2/1993 | Shimanuki et al. | 415/208.1 |
| 5,195,867 | 3/1993 | Stirling | 415/170.1 |

FOREIGN PATENT DOCUMENTS

| | | | |
|---|---|---|---|
| 0151196 | 11/1980 | Japan | 415/208.1 |
| 9226299 | 12/1984 | Japan | 415/208.1 |

Primary Examiner—Edward K. Look
Assistant Examiner—Mark Sgantzos
Attorney, Agent, or Firm—Brezina & Ehrlich

[57] ABSTRACT

A flow directing device is provided for a fluid filled seal chamber for a centrifugal fluid pump, wherein the pump includes a seal chamber housing, a rotary shaft extending through the housing, an impeller mounted on one end of the shaft, and a rotary seal mounted about the shaft. The rotary shaft and housing define the seal chamber opening toward the impeller. A plurality of angled vanes radially depend about a circumferential portion of the seal chamber to direct the flow of fluid in the seal chamber along the rotary shaft to remove suspended solids from the rotary seal when the vanes extend in one direction, and to remove vapor bubbles from adjacent the rotary seal when the vanes extend in another direction and are coupled with a bulkhead flange.

9 Claims, 2 Drawing Sheets

FLUID DIRECTING DEVICE FOR SEAL CHAMBER

FIELD OF THE INVENTION

This invention relates generally to centrifugal pumping apparatus and specifically relates to a device for directing the fluid within a seal chamber of a centrifugal pump to enhance the life and reliability of a rotary seal located within the seal chamber.

BACKGROUND OF THE INVENTION

Centrifugal pumping devices are widely used throughout industry, particularly in the chemical and petroleum processing fields. The typical centrifugal pump includes an impeller connected to one end of a rotary shaft which is rotatably driven by an electric motor, steam turbine, or any suitable prime mover. The impeller is housed within an impeller casing. Fluid entering the casing at the center of the impeller is radially displaced and pressurized by the rotating impeller. The pressurized fluid then exits the casing via an outlet located along the periphery of the casing. Connected to the casing is an adaptor and a bearing frame that supports the rotary shaft extending therethrough. Between the casing and bearing frame is a seal chamber.

Fluid which is pumped through the casing must be prevented from flowing along the rotating shaft and leaking out of the seal chamber and into the environment or into the bearing frame. Rotating mechanical seals or rotary seals located in the seal chamber are generally used to provide this sealing. The typical rotary seal has a rotating seat circumscribing and attached to the rotary shaft and a stationary seat element attached to the seal chamber. The rotating seat may also be mounted on a shaft sleeve which is mounted about the shaft. The rotating seal includes a sealing ring having a sealing face which mates against an opposing face of the seat. The opposing sealing face and seat face form a sealing interface.

As the seal face rotates, friction is generated at the sealing interface. To reduce this friction, a lubricant must be supplied to the sealing interface. Rotary seals are designed such that a minute amount of the fluid within the seal chamber will migrate into the sealing interface to act as a lubricant. This lubricating fluid forms what is referred to as the interface film.

As can be appreciated, the rotation of the exterior surface of the shaft and rotating seal create flows within the fluid located within the seal chamber. In many pump applications, for the rotary seal to continue to function properly, this flow within the seal chamber must perform several functions. The flowing fluid must function to remove heat from the rotary seal, prevent the collection of vapor and gas bubbles around the sealing rings, and prevent solids which are suspended within the fluid from migrating into the sealing interface. However, the fluid flow created within the seal chamber by the rotating shaft and seal is frequently inadequate to perform the above-mentioned functions.

Removing heat from the rotary seal is often the most important functional requirement of the fluid flow in the seal chamber. Even though friction at the sealing interface is reduced by the interface film, the rotary seal can generate considerable heat. If the temperature of the rotary seal becomes elevated due to inadequate heat removal, the likelihood of the interface film vaporizing increases. This vaporization would remove the lubrication between the sealing surfaces causing seal instability and may distress the seal face leading to seal failure. Therefore, the flowing fluid must remove this heat through convection and transfer the heat to a heat sink such as the pump body or the fluid flowing through the casing. Thus, there is a need to direct fluid flow about the seal to improve the heat transfer and prevent a harmful rise in the temperature of the rotary seal and sealing rings.

Fluid flow within the seal chamber must also remove vapor or gas bubbles which can also lead to problems with the rotary seal. There are usually two main sources of vapor in the seal chamber. First vapor can originate from the seal interface if interface film vaporization is occurring. Secondly, many of the fluids pumped may have a trapped gas or vapor. Due to the typical fluid flow dynamics within the seal chamber, much of the vapor within the chamber will be centrifuged toward the pump shaft and into recesses along the seal. The bubbles become trapped by these recesses. Ultimately, the bubbles link up to form a continuous toroid which effectively isolates the sealing interface from the cooling liquid and causes the seal faces to run hotter, causing complete interface film vaporization. A seal under such conditions stands little chance of survival. Directing the fluid in the seal chamber to flow along the rotary seal will flush away the entrapped bubbles. There is a need to direct the fluid flow within the seal chamber to prevent the collection of bubbles about the rotary seal.

The fluid flow in the seal chamber must also flush out solid particles suspended within the pumped fluid as problems can also occur with the rotary seal when the suspended solids flow into the seal chamber. These solids collect around the seal and penetrate the sealing interface where they may become embedded and also can concentrate in the rear of the seal chamber causing wear on the seal chamber. The collection of solids around the seal may break up the interface film and cause extra heating and wear, leading to premature seal failure. Although directing the fluid to flow along the rotary seal will flush away the collected solids, it has been found that directing a flow inward along the rotating shaft and rotary seal and outward along the periphery of the seal chamber is best suited for ejecting the suspended and collected solids. Thus, there is a need to direct the fluid flow within the seal chamber to eject particles away from the sealing rings and sealing interface.

Therefore, there has been a need to direct the flow of fluid within the seal chamber to allow the fluid to remove heat from the rotary seal, remove bubbles from recesses in the seal, and flush solid particles away from the sealing rings and interface.

In an attempt to prevent solid particles from reaching the mechanical seal, a protector device, as disclosed in U.S. Pat. No. 4,872,690, employs a separate annular cup-shaped element which is secured to the pump housing at the entrance to the seal cavity. A circular opening in the cup-shaped element of the protector allows the rotary shaft to pass through the protector with a small annular clearance between the shaft and element. The cup-shaped element also includes a plurality of vent passages around the element's outer circumference. As the shaft and impeller rotate, fluid passing by the vent passages creates a low pressure area outside the seal chamber, thus creating a looped fluid flow around the protector. Fluid, having suspended solids, enters the seal chamber through the annular clearance and is drawn out through the vent passages before the solids are deposited within the chamber.

This protector device is ineffective in correcting a number of the problems described above as well as other problems found in the operation and maintenance of these centrifugal pump systems. One problem is that the small annular clearance and vent passages may become clogged with the solid particles reducing the effectiveness of the protector device. Also, the small annular clearance between the protector device and the shaft results in a wear zone on the impeller due to local increased particle velocity.

An additional problem with the use of the protector is that rotary seals are mounted about the shaft and therefore the diameter of the shaft and mounted seals will be greater than that of the shaft at the point adjacent the cup-shaped element. Thus the small annular clearance between the circular opening of the cup-shaped member and the rotary shaft prevents removal of the seal mounted rotary shaft which is necessary to service the rotary seal. Therefore, to perform maintenance on the rotary seal, the protector must be removed. This lengthens the time and effort required to replace or repair the mechanical seals.

In summary, there is a need for a device which directs the fluid flow within the seal chamber to increase the rate of heat transfer from the rotary seal and flush bubbles or particulates away from the seal interface.

SUMMARY OF THE INVENTION

The above needs are satisfied by the present invention which provides a flow directing structure or device for a fluid filled seal chamber for a centrifugal fluid pump, including a seal chamber, a rotary shaft extending through the seal chamber to drive the impeller, and a rotary seal mounted about the shaft. The invention includes a plurality of angled vanes attached to the seal chamber circumference and extending radially inward to direct the flow of fluid inside the seal chamber along the rotary shaft.

The angled vanes allow for a large radial clearance between the tips of the angled vanes and the outer diameter of the rotary shaft. The clearance allows most mechanical seals including those attached to a shaft sleeve to be removed without the necessity of moving the present invention from the seal chamber.

The present invention also provides for the prevention of the accumulation of solid particles in the seal chamber and improved venting of vapor bubbles which may enter the seal chamber. In particular, the radial separation between each vane allows larger solids to pass through the present invention and thus reduces the possibility of clogging.

The present invention also prevents accumulation of entrained gases and aides in their removal from the seal chamber.

The present invention may also be manufactured as an integral part of the seal chamber thus removing the need for separate installation.

DESCRIPTION OF THE PREFERRED EMBODIMENT

Figure 1:
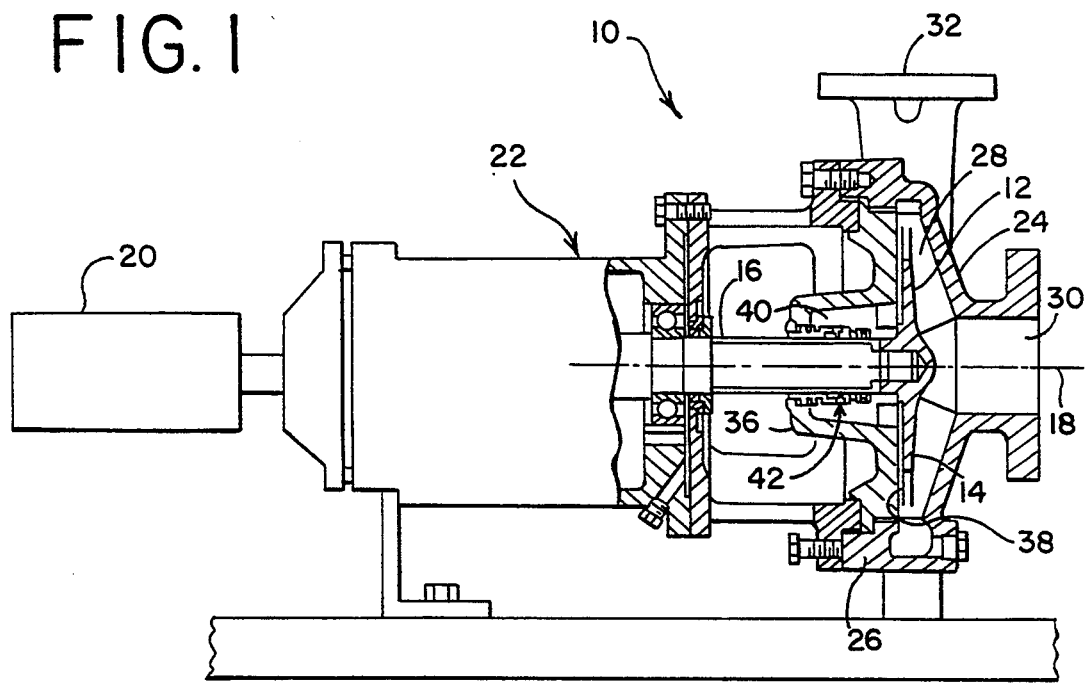
FIG. 1 is a partial section of a side elevational view of a centrifugal pumping apparatus.

Referring now to FIG. 1, a centrifugal pumping system is illustrated generally at 10. The centrifugal pump 10 includes a rotating impeller 12. The impeller 12 is attached to a rotary shaft 16 having a centerline which defines a longitudinal axis 18. Connected to the rearward end of the shaft 16 opposite the impeller 12 is a rotational drive apparatus which is preferably an electric motor 20 but can also be other devices such a steam turbine. It is readily seen that the rotational movement supplied by the motor drives the impeller in a rotational manner about the longitudinal axis 18. The direction of the rotation of the impeller is indicated by A in FIG. 4 and FIG. 6.

The impeller 12 rotates within an impeller cavity 28 defined by a casing 24 and rear cover 26. Fluidly connected to the cavity 28 is an inlet 30 which supplies the fluid to be pumped. Upon the fluid entering the cavity 28 at the center of the impeller 12, the rotating vanes 14 drive the fluid toward the periphery of the cavity which pressurizes the fluid. The fluid then exits the cavity 28 through an outlet 32.

A seal chamber housing 36 is located intermediate a bearing frame 22 and casing 24. The rear face 38 of the impeller 12, the seal chamber housing 36 and the rotary shaft 16 define a seal chamber 40 which opens toward the impeller. To prevent the pumped fluid from migrating from the cavity 28 longitudinally along the rotating shaft 16 and leaking either into the bearing frame 22 or into the environment, a rotary seal, indicated at 42, is located circumferentially about the shaft 16 within the seal chamber 40.

Figure 2:
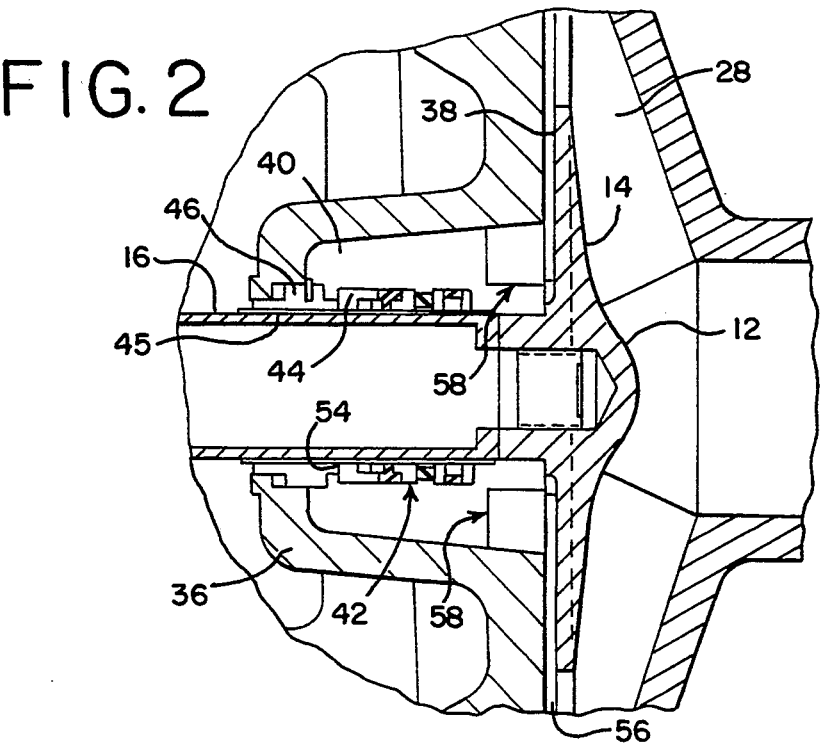
FIG. 2 is a fragmentary vertical sectional view of the seal chamber housing.

Referring to FIG. 2, the typical rotary seal 42 includes a rotating seat 44 which is fixedly attached to a shaft sleeve 45 mounted about the shaft 16. An opposing stationary seat element 46 is fixedly attached to the seal chamber housing 36. The opposing rotating seat 44 and stationary seat 46 define a sealing interface 54.

In operation, the fluid flows from the periphery of the cavity 28 circumferentially inward along a clearance 56 between the rear face 38 of the rotating impeller 12 and the rear cover 26 and fills the seal chamber 40. A minute portion of the fluid will migrate into the sealing interface 54 and act as a lubricant. The rotating rear face 38, shaft 16 and seal element 46 causes the fluid to circulate about the seal chamber 40. This fluid may contain vapor bubbles and suspended solids which, as before-mentioned, may cause premature failure of the rotary seal 42. To direct the flow of fluid about the rotary seal 42 to eject particles and/or vapor bubbles which may collect about the rotating seat 44 and seat 46, a particle/entrained gas ejector or flow directing device is indicated at 58.

Figure 4:
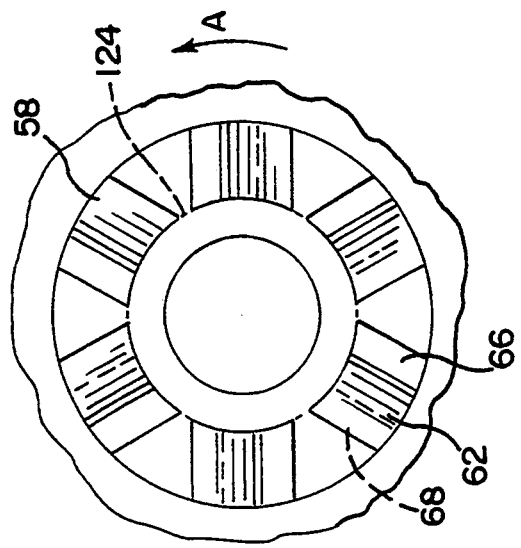
FIG. 4 is a fragmentary front elevational view taken substantially along line 4—4 of FIG. 3.
Figure 3:
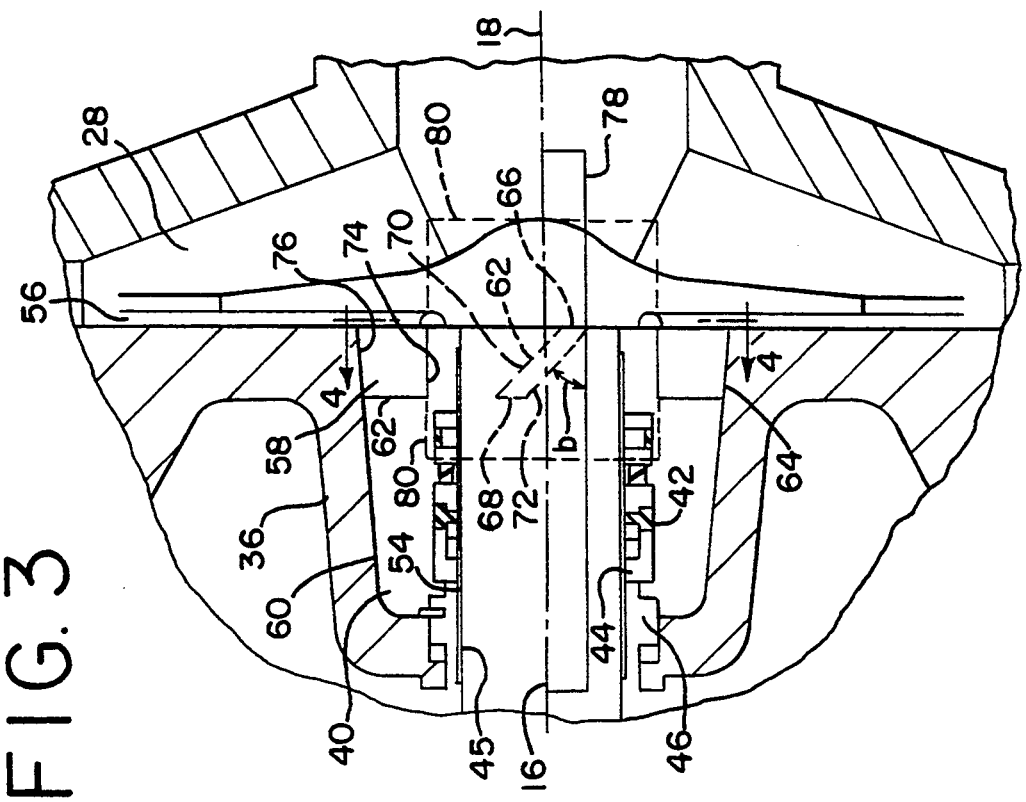
FIG. 3 is a fragmentary vertical sectional view of the forward portion of the centrifugal pumping apparatus in accordance with the preferred embodiment of the present invention.

The preferred embodiment of the ejector 58, as illustrated in FIGS. 3 and 4, directs fluid flow inward along the rotating shaft 16 and outward along a periphery 60 of the seal chamber 40. This fluid flow pattern is better suited for flushing particles away from the rotary seal 42. The ejector 58 includes a plurality of generally radially extending vanes 62 circumferentially spaced about an annular portion 64 of the chamber 40. In the preferred embodiment, the portion 64 is disposed nearer the impeller than the rear of the seal chamber 40 preferably at the opening of the chamber. In the preferred embodiment, there are at least five vanes 62. Each vane 62 contains a forward end 66 and a rearward end 68, a first side surface 70, a second side surface 72, and a tip 74. The vanes 62 are rigidly connected to the seal chamber housing 36 preferably by being cast as an integral part of the seal chamber housing. The portion of the vane 62 connected to the seal chamber housing 36 defines a root 76. To prevent clogging of the ejector 58, the radial spacing between adjacent roots 76 is preferably large enough to allow the passage of suspended solid particulates.

As can be seen in FIGS. 3 and 4, each of the vanes 62 is similarly angled to a corresponding reference plane 78 which extends radially outward from the longitudinal axis 18 and intersects the root 76 of the vane 62 adjacent the forward end 66. The vanes 62 are angled opposite the direction of rotation A of the shaft 16. In other words, from the reference plane 78, the rearward end 68 of the vane 62 is radially located at a point opposite the direction of rotation A. The reference plane 78 and second side surface 72 define an inclination angle b. The inclination angle b is preferably 60° but may range from 10° to 80°.

In operation, the rotation of the shaft 16 and mounted seal 44 create dynamic flow patterns in the seal chamber 40. Suspended solids transported by the fluid which enters the seal chamber from the impeller cavity may settle onto the rotary seal 42 which could cause damage to the sealing interface 54. The ejector 58, however, directs the flow of fluid within the chamber 40 inward along the shaft 16 and rotary seal 42 and outward along the periphery 60 of the seal chamber 40. Suspended solids in close proximity to the rotary seal 42 and particles which have settled on the rotary seal are thereby picked up by the moving fluid and ejected toward the impeller cavity 28, where the particles eventually intermix with the fluid flowing through the pump and exit the cavity through the discharge 32.

To allow sliding removal of the shaft 16, or shaft sleeve 45 with the mounted rotating seal 42, the tips 74 of the vanes 62 define an annular clearance tube shown in phantom at 80. The tube 80 is coaxial with the shaft 16 and has a diameter greater than the outside diameter of the mounted rotary seal 42.

Specific embodiments of the novel particle/air vaned ejector according to the present invention have been described for the purpose of illustrating the manner in which the invention may be made and used. It should be understood that implementation of other variations and modifications of the invention in its various aspects will be apparent to those skilled in the art and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A flow directing device for a fluid filled seal chamber in a centrifugal fluid handling apparatus, the apparatus having a seal chamber housing, a rotary shaft extending through the housing with an impeller mounted on one end thereof, and a rotary seal mounted about the shaft, the rotary shaft and housing defining said seal chamber opening toward the impeller, the flow directing device comprising:

a plurality of angled vanes radially depending about a circumferential portion of the seal chamber to direct the flow of fluid in the seal chamber along the rotary shaft, said vanes being attached to the housing.

2. The flow directing device of claim 1 wherein said angled vanes direct the flow of fluid in said seal chamber initially along said rotary shaft and then along an outer periphery of said seal chamber.

3. The flow directing device of claim 1 wherein each of said vanes includes a tip, and said tips define an annular clearance tube having a diameter greater than the outer diameter of the rotary seal to allow sliding removal of the rotary seal through said circumferential portion.

4. The flow directing device of claim 1 wherein said vanes are circumferentially .disposed within an opening portion of the seal chamber.

5. The flow directing device of claim 1 wherein the quantity of said vanes is greater than five.

6. The flow directing device of claim 5 wherein the quantity of vanes is less than thirteen.

7. The flow directing device of claim 1 wherein the rotary shaft rotates about a longitudinal axis, each of said vanes includes a first side surface, a root, and a first and a second end;

each of said vanes being similarly angled from a reference plane corresponding to each of said vanes, said reference plane radially extending from said longitudinal axis through said root of said vane adjacent said first end.

8. The flow directing device of claim 7 wherein said vanes are angled opposite the direction of rotation of the rotary shaft.

9. The flow directing device of claim 1 wherein said circumferential portion is disposed nearer the impeller than the rear surface of the seal chamber.

* * * * *